Figure 1:
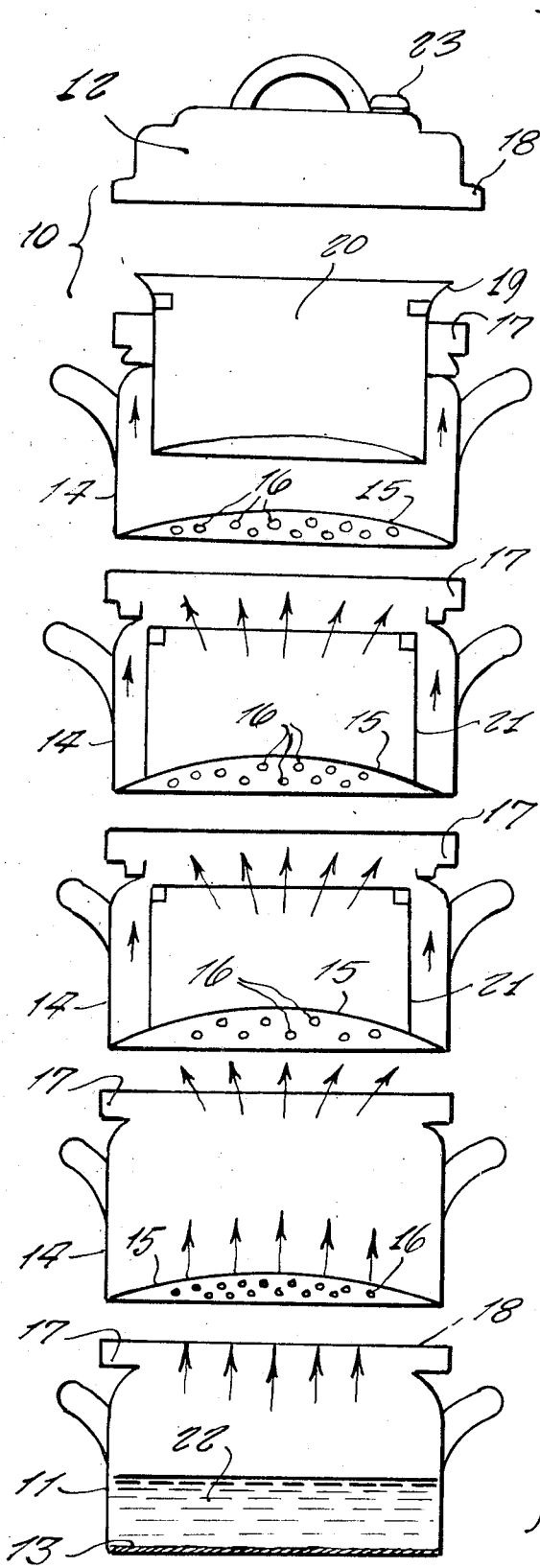

United States Patent
Williams et al.

[15] 3,641,926
[45] Feb. 15, 1972

[54] COMBINATION OF COOKING UTENSILS

[72] Inventors: James M. Williams; Helga Williams, both of 805 N.E. 194th, Seattle, Wash. 98155

[22] Filed: July 2, 1969

[21] Appl. No.: 838,415

[52] U.S. Cl. ................................................99/448, 99/417
[51] Int. Cl. ..........................................................A47j 27/13
[58] Field of Search ...............................99/448, 308–312, 99/317, 339–340, 410, 413, 416–417; 220/4, 17, 64, 66, 71, 82, 97, 97 B, 97 C

[56] References Cited

UNITED STATES PATENTS

| | | | |
|---|---|---|---|
| 987,510 | 3/1911 | Thorne | 99/410 |
| 2,985,095 | 5/1961 | Pitavy | 220/82 X |

FOREIGN PATENTS OR APPLICATIONS

| | | | |
|---|---|---|---|
| 522,441 | 9/1953 | Belgium | 99/413 |
| 736,548 | 6/1943 | Germany | 99/417 |
| 1,071,608 | 6/1967 | Great Britain | 220/4 |

*Primary Examiner*—William I. Price
*Assistant Examiner*—Arthur O. Henderson

[57] ABSTRACT

A combination of pots for cooking an entire meal at one time upon a single burner, the pots being placeable one upon the other so as to receive the heat from therebelow and cooking a food contained therewithin.

1 Claims, 2 Drawing Figures

PATENTED FEB 15 1972

3,641,926

INVENTORS
JAMES M. WILLIAMS
AND
HELGA WILLIAMS

COMBINATION OF COOKING UTENSILS

This invention relates generally to cooking utensils.

It is generally well known, that the preparation of an average, entire meal requires the service of several pots, each of which must be placed upon an individual burner of a stove so that the content thereof may be cooked. Upon occasion, a homemaker will find that she requires several more pots of food to be cooking at the same time than the number of burners provided by the stove, and accordingly she must wait until one food item is cooked before she may remove the same from the burner and allow another food item to then have the burner for cooking. This is of course objectionable in view that all of the food items may not be prepared at the same time.

According, it is the principle object of the present invention to provide a combination of cooking utensils which will allow an entire meal to be cooked at one time and upon a single burner.

Another object of the present invention is to provide a combination of cooking utensils comprised of pots which are placeable one over the other so as to utilize the heat from there below for cooking the food contained within each.

Yet another object of the present invention is to provide a combination of cooking utensils wherein the foods are cooked with steam from water in a bottom pot.

Yet a further object is to provide a combination of cooking utensils which will conserve on the consumption of burner fuel, and which will provide the homemaker with less time to spend in the kitchen.

Another object of the present invention is to provide a combination of cooking utensils wherein the food will also contain a greater nutritional value and that value will not be boiled out.

Other objects of the present invention are to provide a combination of cooking utensils which is simple in design, inexpensive to manufacture, rugged in construction, easy to use and efficient in operation.

Figure 2:
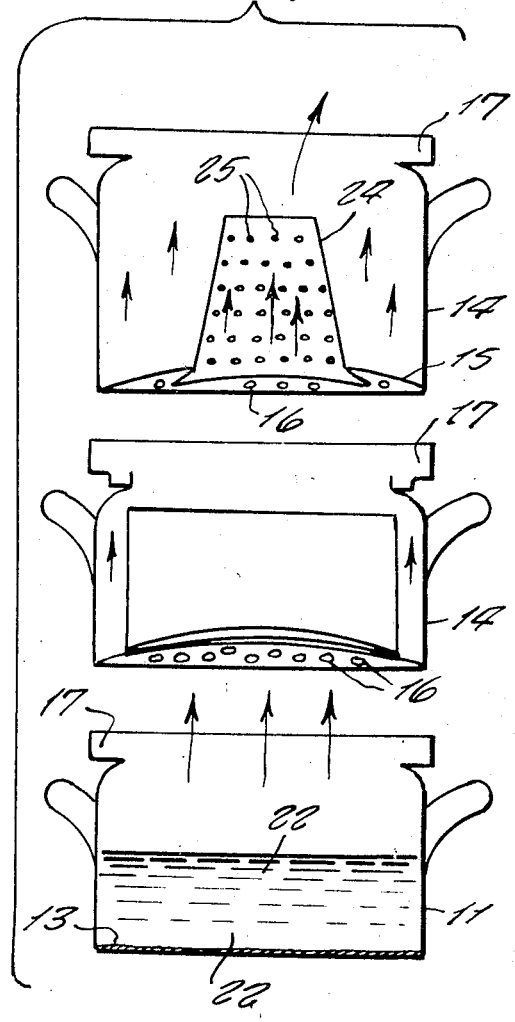

These and other objects will be readily evident upon a study of the following specification and the accompanying drawing wherein:

FIG. 1 is an exploded side elevation view showing diagrammatically the components of the present invention, and FIG. 2 is a similar view showing a modified form of the present invention.

Referring now to the drawing in detail, and more specifically to FIG. 1, the reference numeral 10 represents a cooking utensil combination according to the present invention wherein a bottom pot 11 upon which there are fitted, one into the other, a plurality of upper pots, the uppermost pot being 50 enclosed by a lid 12.

The bottom pot 11 comprises a vessel having a relatively thick bottom 13 which preferably should be approximately one quarter inch in thickness. The reason for this is that the bottom 13 is positioned adjacent the burner flames of a stove. Each of the upper pots 14 are provided with an upwardly arcuate bottom wall 15, the walls 15 having a plurality of openings 16 therethrough, the number of openings in the pots being varied so as to affect the speed of cooking the food contained therewithin.

The bottom pot, as well as the upper pots are each provided with a peripheral recess 17 around the upper edge 18 thereof, the recess comprising a seat into which the lower end of a pot thereabove may be fitted. The uppermost pot recess 17 serves to receive the flange 18 of the lid 12.

Alternately, the flange 18 of the lid may be fitted over the upper edge 19 of a metal bowl insert 20 which is receivable within the uppermost pot. A plurality of glass insert bowls 21 may be also included with the present invention, the glass insert bowls being placeable into the pots as shown for the purpose of holding various foods which are intended to be cooked; the glass bowls being held by metal frames in the pots.

In operative use, a quantity of water 22 is positioned within the lower most pot 11 while the upper pots 14 are each filled with various foods for being cooked. The lid 12 is placed upon the uppermost bowl insert or uppermost pot and the flame is put on the burner. When the water 22 boils, the steam from the water is passed upwardly through the openings from one pot to the next until at the uppermost pot 14, the steam is moved outwardly through a steam escape opening 23 within the lid. The steam moving through the various pots will cook the different foods placed within each of the pots or within the glass insert bowls or metal insert placed within the pots. Cooking odors will be held to a minimum as they are consumed within the steam passing through the assembly. There will be very little loss of nutritional value in the food and it requires less time for a homemaker within the kitchen in preparing foods. The fuel consumption for a single burner will save on fuel costs. All types of foods may be cooked, such as steamed clams in shell, rice, boiled eggs, potatoes, fresh vegetables, shrimp, dumplings, boiling or stewing chicken, boiling beef, heart, kidneys, liver, ham, spaghetti, macaroni, salad macaroni, all type of beans, crabmeat, scallops, fish, soups and other various foods.

As shown in FIG. 2 of the drawing, a generally connically configurated insert 24 having a plurality of openings 25 there through may be centrally positioned within one of the upper pots 14, the insert being used for cooking fruit from which juice is to be extracted during cooking process, the fruit being placed around the insert, and the juice draining down into the glass bowl insert within the center of the pot. Thus a pure juice can be extracted by this method.

To make potato salad, the potatoes and eggs may be cooked in the same pot, by placing them preferably in the pot immediately above the bottom pot where the active steam from the bottom pot will pass upwardly into the pot and cook the potatoes and eggs.

The present type of cooking will promote better health for it provides a cooking method of food which does not include frying.

It is to be understood that the present invention may be made to include a built-in electrical heat unit which is attached to the bottom of the bottom pot, in the manner of a home french fryer, thereby eliminating the necessity of placing the invention on a stove burner.

What we now claim is:

1. In a combination of cooking utensils, the combination of a bottom pot, and of series of upper pots for placement upon said bottom pot, and a lid for placement upon an uppermost of said pots, each of said pots above said bottom pot having an upwardly concave bottom wall that is perforated, all of said pots being provided at their upper ends with a peripheral recess into which a lower end of a pot thereabove or said lid is receivable, certain of said pots having a removable glass bowl insert fitted thereinto, each of said glass bowl inserts including a cylindrical sidewall and an upwardly concave bottom wall and being of a smaller diameter than the interior of said pot into which they are fitted, while an upper pot above said pots containing said inserts is provided with a conically configurated insert compressing a conical sidewall only with perforations therethrough.

* * * * *